US009168670B2

(12) United States Patent
Bergquist et al.

(10) Patent No.: US 9,168,670 B2
(45) Date of Patent: Oct. 27, 2015

(54) BATTERY DRIVEN ELECTRIC POWER TOOL WITH BRUSHLESS MOTOR

(75) Inventors: Oskar Bergquist, Huskvarna (SE); Johan Björnlinger, Jönköping (SE); Johan Svennung, Jönköping (SE); Magnus Lundgren, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 451 days.

(21) Appl. No.: 13/578,333

(22) PCT Filed: Feb. 11, 2010

(86) PCT No.: PCT/EP2010/000834
§ 371 (c)(1),
(2), (4) Date: Sep. 20, 2012

(87) PCT Pub. No.: WO2011/098097
PCT Pub. Date: Aug. 18, 2011

(65) Prior Publication Data

US 2013/0000132 A1 Jan. 3, 2013

(51) Int. Cl.

| | |
|---|---|
| ***B25F 5/00*** | (2006.01) |
| ***B27B 17/08*** | (2006.01) |
| ***H02K 7/14*** | (2006.01) |
| ***B27B 17/12*** | (2006.01) |

(52) U.S. Cl.
CPC ................. *B27B 17/08* (2013.01); *B27B 17/12* (2013.01)

(58) Field of Classification Search
CPC ................................ B27B 17/08; B27B 17/12
USPC ............. 310/75 R, 50; 30/381, 216, 228, 276
See application file for complete search history.

(56) References Cited

U.S. PATENT DOCUMENTS

| | | | | |
|---|---|---|---|---|
| 2,157,970 | A * | 5/1939 | Rowland et al. | 184/35 |
| 3,763,962 | A * | 10/1973 | Gottlieb | 184/15.2 |
| 3,870,125 | A * | 3/1975 | Gorski | 184/15.1 |
| 3,967,698 | A | 7/1976 | Smith et al. | |
| 4,249,117 | A | 2/1981 | Leukhardt et al. | |
| 4,317,176 | A | 2/1982 | Saar et al. | |
| 4,550,277 | A | 10/1985 | Carney | |

(Continued)

FOREIGN PATENT DOCUMENTS

| | | |
|---|---|---|
| CN | 201179671 | 1/2007 |
| CN | 101337357 | 1/2009 |

(Continued)

OTHER PUBLICATIONS

Translation to foreign document EP 2072200 (Year: 2009).*

(Continued)

*Primary Examiner* — Alex W Mok
(74) *Attorney, Agent, or Firm* — Nelson Mullins Riley & Scarborough LLP

(57) ABSTRACT

An electric power tool (100) includes a power source (102) enclosed in a casing (104). The power source (102) is a brushless DC motor (202) which drives a drive mechanism (106) for a cutting device. Further, an oil pump is at least partly housed in the casing (104) of the electric power tool (100). The oil pump is also driven by the brushless DC motor (202).

18 Claims, 4 Drawing Sheets

(56) References Cited

U.S. PATENT DOCUMENTS

| | | | | |
|---|---|---|---|---|
| 4,893,407 | A | 1/1990 | Lane | |
| 4,981,129 | A | 1/1991 | Osterman et al. | |
| 5,243,764 | A * | 9/1993 | Wieland | 30/383 |
| 5,322,103 | A * | 6/1994 | Hudson | 144/24.13 |
| 5,423,393 | A * | 6/1995 | Felt | 180/221 |
| 5,855,067 | A * | 1/1999 | Taomo et al. | 30/122 |
| 6,253,717 | B1 * | 7/2001 | Doyle | 123/44 D |
| 6,479,958 | B1 | 11/2002 | Thompson et al. | |
| 6,819,022 | B2 | 11/2004 | Yamamoto et al. | |
| 7,007,762 | B2 | 3/2006 | Yamamoto | |
| 7,178,436 | B2 | 2/2007 | Wilson | |
| 7,314,353 | B2 * | 1/2008 | King et al. | 417/470 |
| 7,372,226 | B2 | 5/2008 | Wiker et al. | |
| 2001/0017159 | A1 * | 8/2001 | Sato et al. | 137/318 |
| 2006/0037766 | A1 | 2/2006 | Gass et al. | |
| 2006/0237205 | A1 * | 10/2006 | Sia et al. | 173/48 |
| 2007/0034294 | A1 | 2/2007 | Chapman | |
| 2008/0040001 | A1 * | 2/2008 | Ogawa et al. | 701/41 |
| 2009/0128348 | A1 | 5/2009 | Hsu | |
| 2009/0145568 | A1 * | 6/2009 | Chaterjee et al. | 164/57.1 |
| 2009/0207035 | A1 | 8/2009 | Watanabe et al. | |
| 2011/0005088 | A1 * | 1/2011 | Pellenc | 30/383 |

FOREIGN PATENT DOCUMENTS

| | | | |
|---|---|---|---|
| EP | 0024268 | A1 | 2/1981 |
| EP | 2072200 | | 6/2009 |
| JP | 2006150571 | A | 6/2006 |
| WO | 2008113893 | | 9/2008 |
| WO | WO 2008156602 | A1 * | 12/2008 |
| WO | WO 2009047432 | A2 * | 4/2009 |
| WO | WO 2009106716 | A2 * | 9/2009 |

OTHER PUBLICATIONS

Brushless Motor Works in Direct Drive Applications, Published on Apr. 22, 2002, http://news.thomasnet.com/fullstory/8746.

International Search Report and Written Opinion of PCT/EP2010/000834 mailed Nov. 2, 2010.

Chapter I International Preliminary Report on Patentability of PCT/EP2010/000834 mailed Aug. 14, 2012.

* cited by examiner

BATTERY DRIVEN ELECTRIC POWER TOOL WITH BRUSHLESS MOTOR

TECHNICAL FIELD

The present invention relates to a hand-held battery powered tool. In particular, the present invention relates to driving mechanism of the battery powered tool for example, chainsaw, trimmer, drill or hedgetrimmer.

BACKGROUND

Hand-held power tools, for example, but not limited to, chainsaws, trimmers and hedgetrimmers are extensively used in garden and forestry applications. These power tools are required to be made compact and light weight for easy handling during operation. Typically, a power tool includes a power source which is drivably connected to a cutting device. Further, one or more handles are provided on the power tool to facilitate manual gripping during operation.

Typically, most of the power tools known in the art use a brush type DC motor as the power source. The brush type motor includes an electromagnetic rotor and a permanent magnet stator. During operation of the brush type DC motor, a brush assembly provides commutation between the rotor and the stator which is necessary for a continuous rotation of the rotor. Though, the power tools using the brush type DC motor are small and compact, the speed of the brush type DC motor is limited to a pre-determined range depending on the design and material of the brush assembly. Thus, these power tools typically utilize a gear assembly between the brush type DC motor and the cutting device.

The gear assembly not only increases the overall cost and weight of a power tool, but also the components of the gear assembly may require periodic maintenance and the overall running cost of the power tool increases. Further, an oil pump is provided to supply lubricant to the gear assembly and also to other moving parts of the power tools. Typically, the oil pump is driven by an auxiliary electric motor which further increases weight, running costs, and power and space requirements.

Moreover, in the brush type DC motor, the brushes may tend to wear out over a period of time due to constant friction and thus, need to be replaced periodically. This increases the maintenance requirements and requires regular disassembling of the power tool. Furthermore, at high speeds, the brush assembly may cause sparks during commutation, which is highly undesirable.

In light of the foregoing, there is a need for an improved method and system which addresses the above problems in a power tool, for example chainsaws, trimmers, hedgetrimmers etc.

SUMMARY

In view of the above, it is an objective to solve or at least reduce the problems discussed above. In particular, the objective is to provide an improved power source and drive system for an electric power tool that is simpler, compact and efficient.

The objective is achieved according to example embodiments of a novel electric power tool described below. The electric power tool includes a power source enclosed in a casing of the electric power tool. The electric power tool further includes a driving mechanism for a cutting device. The power source is a brushless DC motor. The use of the brushless DC motor as a power source enables the power source to be directly connected to the driving mechanism for the cutting device without an intermediate gear assembly. The absence of an intermediate gear assembly results in less space and maintenance requirements, and higher efficiency. Further, an oil pump, which is at least partly housed in the casing of the electric power tool, is also driven by the brushless DC motor. This obviates the need for an auxiliary motor for driving the oil pump and leads to lower costs, and a lighter and more compact construction of the electric power tool.

According to other example embodiments, the driving mechanism for the cutting device includes a central shaft connected to an input hub. The input hub is further connected to an output hub via a spring clutch assembly. Further, the central shaft is connected to the brushless DC motor whereas the output hub is connected to a driving sprocket. The spring clutch assembly includes a cylindrical spring such that the cylindrical spring is wrapped around the input hub and is also partially wrapped around the output hub. The spring clutch assembly avoids a need for a complex clutch assemblies for example, dog clutch, friction plate clutch and centrifugal clutch.

According to some example embodiments, the power tool further includes a brake assembly, the brake assembly including a collar member with a projecting lug. A brake lever is configured to be selectively engageable with the projecting lug to perform a braking action.

According to another embodiment, the oil pump is driven by the brushless DC motor via a worm gear assembly, the worm gear assembly including a worm gear and a worm wheel. Alternatively, the worm gear is mounted on an output hub of the drive mechanism while the worm wheel is provided on a secondary shaft, such that the worm gear is engageable with the worm wheel. According to another embodiment, the secondary shaft is connected to the oil pump. The worm gear may also be is mounted on the output hub, such that the worm gear extends at least partially over a spring clutch assembly of the driving mechanism. This configuration does not increase a size of the driving mechanism in a linear direction and results in a compact structure of the power tool.

In some example embodiments, the brushless DC motor includes a permanent magnet rotor and an electromagnetic stator. Additionally, the brushless DC motor may be connected to a battery.

According to example embodiments, the electric power tool can be one of a chainsaw, a line trimmer, a hedgetrimmer, a powered shear and a powered drill

BRIEF DESCRIPTION OF THE DRAWINGS

The invention will in the following be described in more detail with reference to the enclosed drawings, wherein.

DESCRIPTION OF EMBODIMENTS

Figure 1:
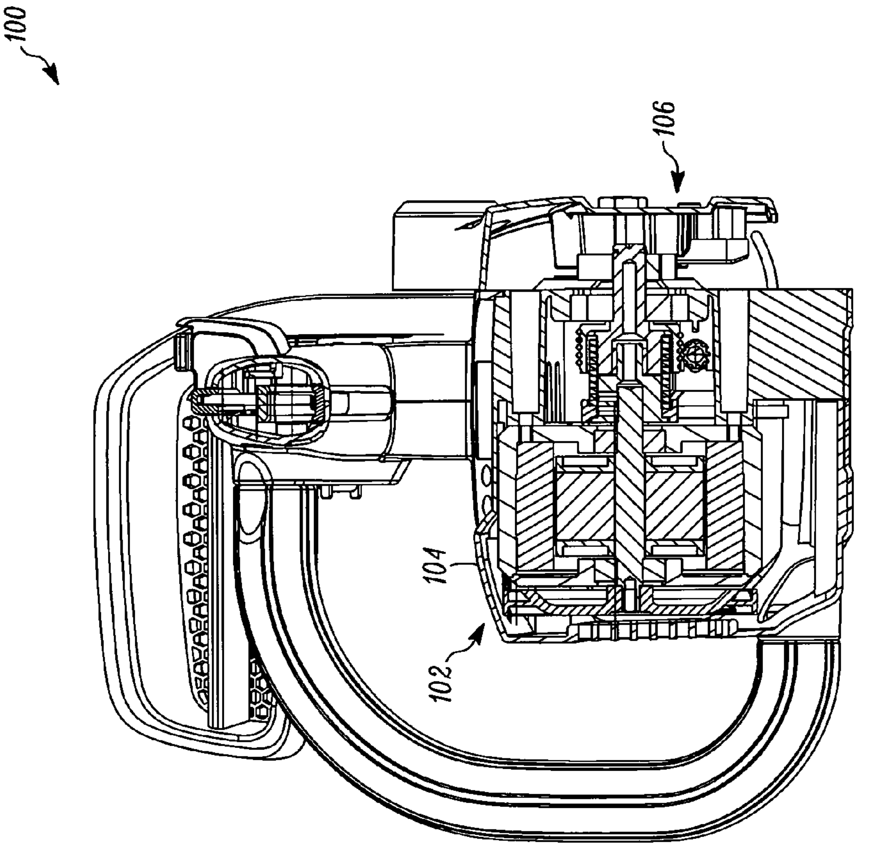
FIG. 1 illustrates a sectional view of an electric power tool, according to an embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 illustrates a sectional view of a chainsaw 100, according to an embodiment of the invention. The chainsaw 100 (hereinafter referred to as the "electric power tool 100") may be used in gardening or forestry applications. However, the present invention may also be used in any another equipment, for example, trimmers, hedgetrimmers, drills, or other cutting or pruning tools without departing from the essence of the present invention.

In an embodiment of the present invention, the electric power tool 100 includes a power source 102 which is enclosed in a casing 104 of the electric power tool 100. Further, the electric power tool 100 may include a cutting device (not shown) which is drivably connected to the power source 102. In an embodiment of the present invention, the cutting device may include a toothed chain. In various other embodiments of the present invention, the cutting device may include, for example, but not limited to, a hedgecutter, a trimmer, a drill, a powered shear, or the like. The electric power tool 100 may include a drive mechanism 106 to transmit a rotary motion of the power source 102 to the cutting device, for example, in case of the chainsaw; the power source 102 may transmit motion to the toothed chain to perform cutting operation.

In an embodiment of the present invention, the drive mechanism 106 is directly connected to the cutting device without the use of an intermediate gear assembly. The electric power tool 100 has lesser weight, a simpler structure and an overall smaller size which are attributed to the absence of the gear assembly. Also during operation, the electric power tool 100 generates less heat and thus, the cooling requirement of the drive mechanism 106 is less. Moreover, the electric power tool 100 has higher operational efficiency and offers easy handling during operation.

Figure 2:
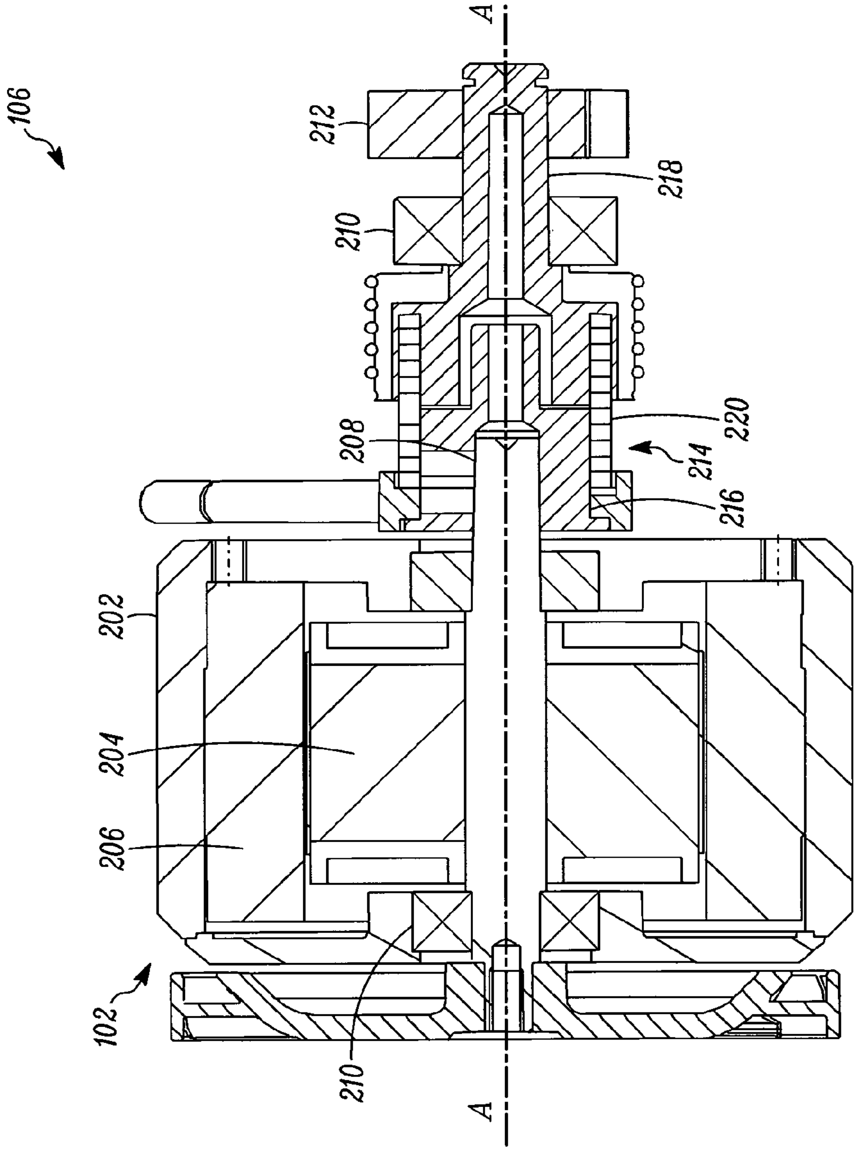
FIG. 2 illustrates an enlarged sectional view of a drive mechanism of the electric power tool, according to an embodiment of the invention.

FIG. 2 illustrates an enlarged sectional view of the drive mechanism 106 of the electric power tool 100. In an embodiment of the present invention, the power source 102 of the electric power tool 100 may include a brushless DC motor 202. The brushless DC motor 202 may have a permanent magnet rotor 204 (hereinafter referred to as the "rotor 204") and an electromagnet with coils mounted as a stator 206. In an embodiment of the present invention, the stator 206 of the brushless DC motor 202 may include multiple poles in which the coils may be mounted. Sequentially switching a magnetic polarity of the poles may cause the rotor 204 to change an alignment with respect to the poles and the combined motion may cause the rotary motion of the rotor 204 about an axis of rotation A.

In an embodiment of the present invention, the brushless DC motor 202 may be connected to a battery (not shown) to supply electric power to the brushless DC motor 202. The battery may be selected as per the design specifications of the electric power tool 100. In an embodiment of the present invention, the battery may be enclosed inside the casing 104 of the electric power tool 100. In an embodiment of the present invention, the battery may be positioned such that a center of gravity of the electric power tool 100 may be optimized to enable a better grip and handling of the electric power tool 100 during operation. In another embodiment, the battery may be positioned in an additional housing external to the electric power tool 100, in which case wire members may be required to connect the external battery to the brushless DC motor 202. Further, a charging arrangement may be provided to charge the battery periodically from a direct power supply. In still another embodiment of the present invention, the brushless DC motor 202 may be directly driven from an AC source, in which case a converter circuit may be required to convert AC power supply to DC supply for the brushless DC motor 202.

A switching arrangement (not shown) for the brushless DC motor 202 may be provided to switch the poles of the stator 206 in a periodic manner and impart the rotary motion of the rotor 204. The switching arrangement may be positioned between the battery and the brushless DC motor 202. A switching frequency of the poles may have direct effect on the rotating speed of the brushless DC motor 202 and may cause a motion of the cutting device. To control the speed of the cutting device the switching arrangement may be connected to a speed control lever or switch mounted on the electric power tool 100.

In an embodiment of the present invention, the rotary motion of the rotor 204 of the brushless DC motor 202 may be transferred to a central shaft 208. The central shaft 208 may be attached to the rotor 204 of the brushless DC motor 202 such that the axis of rotation A of the rotor 204 and the central shaft 208 are concurred. The central shaft 208 may be connected to the rotor 204 via keys or pins (not shown in the figures) to restrict an axial movement of the central shaft 208 with respect to the rotor 204. In an embodiment of the present invention, the central shaft 208 may be supported on bearings 210. The bearings 210 may be, for example, but not limited to, roller bearings, fluid bearings, or the like. In various embodiments of the present invention, the central shaft 208 may include balancing weights (not shown in the figures) to stabilize the rotational motion of the central shaft 208.

In an embodiment of the present invention, the central shaft 208 may be selectively connected to a driving sprocket 212 via a spring clutch assembly 214. In an embodiment of the present invention, the driving sprocket 212 may be provided partially outside the casing 104 for the power electric tool 100 and functionally connected to the cutting device. In an embodiment of the present invention, the driving sprocket 212 may transfer the rotary motion to the toothed chain, such that the toothed chain moves over a chain guide (not shown). The driving sprocket 212 may have teeth which engage the multiple drive links of the toothed chain to transfer the rotary motion. In an embodiment of the present invention, the driving sprocket 212 may also be fitted with additional components, for example, but not limited to, a dust cover.

In an embodiment of the present invention, the spring clutch assembly 214 may include an input hub 216 and an output hub 218. As shown in the FIG. 2 the central shaft 208 is connected to the input hub 216 and further, a cylindrical spring 220 is wrapped around the input hub 216 and is also partially around the output hub 218 with a slight interference fit. During operation, as the central shaft 208 and the input hub 216 rotates, the cylindrical spring 220 wraps on the output hub 218. This reduces an internal diameter of the cylindrical spring 220 and consequently, the cylindrical spring 220 grips the output hub 218 to transmit the motion of the rotor 204.

Figure 3:
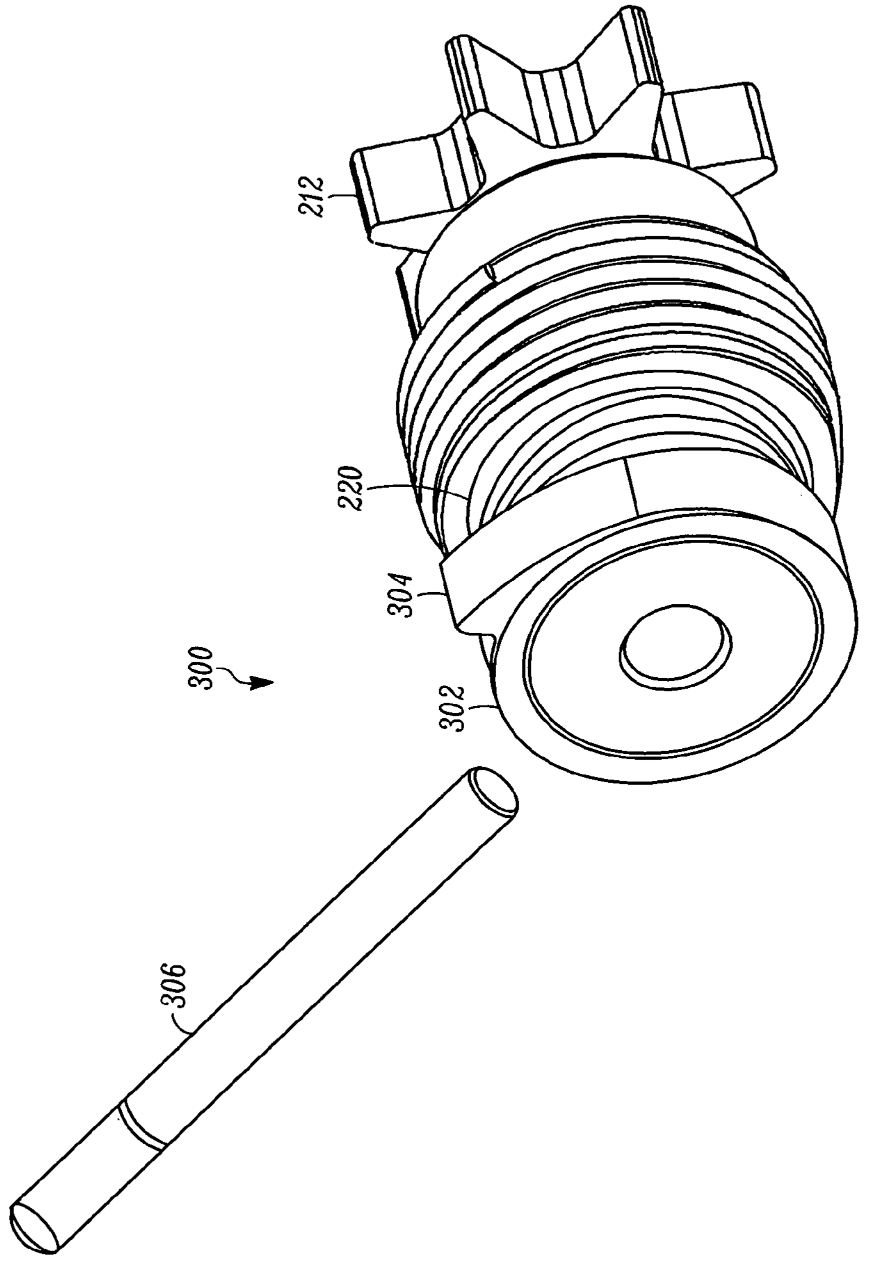
FIG. 3 illustrates a brake assembly for the electric power tool according to an embodiment of the present invention.

FIG. 3 illustrates a brake assembly 300 for the electric power tool 100 according to an embodiment of the present invention. In an embodiment of the present invention, the cylindrical spring 220 may be enclosed by a collar member 302 which has a projecting lug 304 on its outer diameter and an inner slot (not shown) which engages with a radial tang at an input end (not shown) of the cylindrical spring 220. A brake lever 306 is provided to engage with the projecting lug 304 during the braking. This may arrest a radial tang at the input end of the cylindrical spring 220 and uncouple the input hub 216. In an embodiment of the present invention, the brake assembly 300 may get activated whenever a kick back of the cutting device is detected. In another embodiment of the present invention, the brake assembly may be activated with an emergency kill switch provided on the electric power tool 100.

Figure 4:
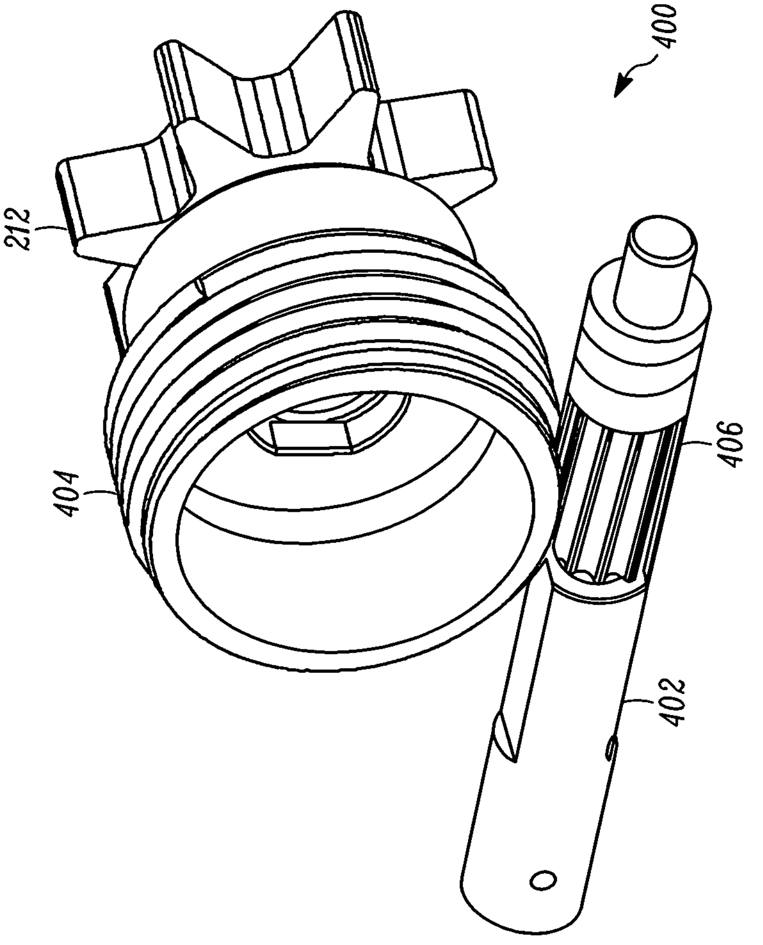
FIG. 4 illustrates a worm wheel assembly used for driving an oil pump in the electric power tool, according to an embodiment of the present invention.

FIG. 4 shows a worm gear assembly 400 for driving an oil pump (not shown) of the electric power tool 100, according to an embodiment of the present invention. The oil pump is driven by the power source 102 via the worm gear assembly 400. The worm gear assembly 400 is used to transfer the power from the central shaft 208 to a secondary shaft 402 via a worm gear 404. The worm gear 404 may be attached to the outer surface of the output hub 218 and a corresponding worm wheel 406 is provided on the secondary shaft 402. The worm gear 404 has a tooth in the form of a screw thread and the worm wheel 406 is a gear with teeth, such that the teeth of the worm wheel 406 engage with the screw thread on the worm gear 404. The worm wheel 406 may be, for example, but not limited to, a spur gear, a helical gear, a herringbone gear, or the like. In an embodiment of the present invention, the worm gear assembly may be self-locking, such that the worm gear 406 drives the worm wheel 406 and not vice versa. In an embodiment of the present invention, the worm gear 404 and the worm wheel 406 may be made of different materials according to various parameters, such as power requirements, friction, ease of manufacturing, cost etc. The worm gear 404 may be made of, for example, but not limiting to, case hardened steel, carbon steel, cast iron, plastic, or the like, whereas the worm wheel 406 may be made of, for example, but not limiting to, phosphor bronze, cast iron, plastic, or the like.

The details of the worm gear assembly 400 in the example embodiment are for illustration purposes and it may be apparent to a person ordinarily skilled in the art that the oil pump may be driven by any other gear assembly which may include, for example, but not limited to, spur gears, helical gears, bevel gears, worm and worm wheels, or a combination of any of these.

The electric power tool 100 as described above is a compact structure due to the reduced size of the driving mechanism, attributed to the use of the brushless DC motor 202 and absence of an extra motor for driving the oil pump. In an embodiment of the present invention, the brushless DC motor 202 may run at predetermined speed ranges to control the speed of the cutting device during operation.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. An electric power tool comprising:
- a power source enclosed in a casing, wherein the power source is a brushless DC motor;
- a drive mechanism for a cutting device, wherein the drive mechanism comprises a central shaft and a spring clutch assembly and is driven by the brushless DC motor, wherein the central shaft, spring clutch assembly and DC brushless motor share a common axis, wherein the central shaft extends from the DC brushless motor into the spring clutch assembly;
- an oil pump, wherein the oil pump is at least partly housed in the casing of the electric power tool;
- wherein the oil pump is driven by the brushless DC motor.

2. An electric power tool according to claim 1, wherein the spring clutch assembly comprises a cylindrical spring such that the cylindrical spring is wrapped around an input hub and is also partially wrapped around an output hub.

3. An electric power tool according to claim 2, wherein the central shaft is connected to the brushless DC motor and the output hub is connected to a driving sprocket.

4. An electric power tool according to claim 1, further comprising a brake assembly, wherein the brake assembly comprises a collar member provided with a projecting lug such that a brake lever is selectively engageable with the projecting lug.

5. An electric power tool according to claim 1, wherein the oil pump is driven by the brushless DC motor via a worm gear assembly, the worm gear assembly comprising a worm gear and a worm wheel.

6. An electric power tool according to claim 5, wherein the worm gear is mounted on an output hub of the drive mechanism and the worm wheel is provided on a secondary shaft, such that the worm gear is engageable with the worm wheel.

7. An electric power tool according to claim 6, wherein the secondary shaft is connected to the oil pump.

8. An electric power tool according to claim 6, wherein the worm gear is mounted on the output hub, such that the worm gear extends at least partially over a spring clutch assembly of the driving mechanism.

9. An electric power tool according to claim 1, wherein the brushless DC motor comprises a permanent magnet rotor and an electromagnetic stator.

10. An electric power tool according to claim 1, wherein the brushless DC motor is connected to a battery.

11. An electric power tool according to claim 1, wherein the electric power tool is a chainsaw.

12. An electric power tool according to claim 1, wherein the electric power tool is a line trimmer.

13. An electric power tool according to claim 1, wherein the electric power tool is a hedgetrimmer.

14. An electric power tool according to claim 1, wherein the electric power tool is a powered shear.

15. An electric power tool according to claim 1, wherein the electric power tool is a powered drill.

16. An electric power tool comprising:
- a power source enclosed in a casing, wherein the power source is a brushless DC motor;
- a drive mechanism for a cutting device, wherein the drive mechanism comprises a central shaft and a spring clutch assembly and is driven by the brushless DC motor, wherein the central shaft, spring clutch assembly and DC brushless motor share a common axis, wherein the central shaft extends from the DC brushless motor into the spring clutch assembly;
- an oil pump, wherein the oil pump is at least partly housed in the casing of the electric power tool; and
- a brake assembly, wherein the brake assembly comprises a collar member provided with a projecting lug such that a brake lever is selectively engageable with the projecting lug,
- wherein the oil pump is driven by the brushless DC motor.

17. An electric power tool comprising:
- a power source enclosed in a casing, wherein the power source is a brushless DC motor;
- a drive mechanism for a cutting device, wherein the drive mechanism comprises a central shaft, and a spring clutch assembly and is driven by the brushless DC motor, wherein the central shaft, spring clutch assembly and DC brushless motor share a common axis, wherein the central shaft extends from the DC brushless motor into the spring clutch assembly;

an oil pump, wherein the oil pump is at least partly housed in the casing of the electric power tool;

wherein the oil pump is driven by the brushless DC motor via a worm gear assembly, the worm gear assembly comprising a worm gear and a worm wheel, wherein the worm gear is mounted on an output hub of the drive mechanism and the worm wheel is provided on a secondary shaft, such that the worm gear is engageable with the worm wheel and extends at least partially over the spring clutch assembly of the driving mechanism.

18. An electric power tool according to claim 17, wherein the worm gear assembly is self-locking, such that the worm gear may drive the worm wheel, but the worm wheel cannot drive the worm gear.

* * * * *